United States Patent
Rawat et al.

(10) Patent No.: US 12,450,077 B2
(45) Date of Patent: Oct. 21, 2025

(54) SYSTEM AND METHOD FOR DETECTING A TARGET ELEMENT IN A JAVA APPLICATION

(71) Applicant: WHATFIX PRIVATE LIMITED, Karnataka (IN)

(72) Inventors: Vibhu Rawat, Karnataka (IN); Vaibhav Raghunath More, Karnataka (IN)

(73) Assignee: WHATFIX PRIVATE LIMITED, Bangalore (IN)

( * ) Notice: Subject to any disclaimer, the term of this patent is extended or adjusted under 35 U.S.C. 154(b) by 177 days.

(21) Appl. No.: 18/526,485

(22) Filed: Dec. 1, 2023

(65) Prior Publication Data
US 2025/0181369 A1   Jun. 5, 2025

(51) Int. Cl.
*G06F 9/451* (2018.01)
*G06F 8/38* (2018.01)

(52) U.S. Cl.
CPC .............. *G06F 9/453* (2018.02); *G06F 8/38* (2013.01)

(58) Field of Classification Search
CPC .................................. G06F 9/453; G06F 8/38
See application file for complete search history.

(56) References Cited

U.S. PATENT DOCUMENTS

| | | | | |
|---|---|---|---|---|
| 6,789,254 B2 * | 9/2004 | Broussard | ............... | G06F 9/54 717/108 |
| 6,944,846 B2 * | 9/2005 | Ryzhov | ............... | G06F 9/454 717/100 |
| 6,993,773 B2 * | 1/2006 | Broussard | ............... | G06F 8/38 715/762 |
| 2006/0101453 A1 * | 5/2006 | Burkhart | ............... | G06F 8/60 717/118 |
| 2015/0268976 A1 * | 9/2015 | O'Neill | ............... | G06F 9/45504 717/148 |

* cited by examiner

*Primary Examiner* — Tadesse Hailu
(74) *Attorney, Agent, or Firm* — Tim Tingkang Xia, Esq.; Troutman Pepper Locke LLP

(57) ABSTRACT

A system (100) and a method (400) for detecting a target element in a Java application is disclosed. The system (100) comprises one or more user devices (110) in communication with a server (40). The user device comprises a processor configured to receive a selection of a target element via a user interface of the Java application. The processor is configured to traverse from the target element to a root element along a traversal path. The traversal path comprises elements. The processor is configured to determine one or more neighboring elements of the target element. The processor is configured to capture and store the elements and attributes of each of the elements on the traversal path and the one or more neighboring elements on the server (40), thereby creating reference data for enabling detection of the target element.

15 Claims, 7 Drawing Sheets

SYSTEM AND METHOD FOR DETECTING A TARGET ELEMENT IN A JAVA APPLICATION

FIELD OF THE INVENTION

Present invention relates to a system and a method for detecting a target element in a Java application.

BACKGROUND OF THE INVENTION

Digital Adoption Platforms (DAPs) provide assistance to an end user in navigating or accessing an application or a webpage. The DAPs need to understand an underlying framework and a structure of user interface elements within the underlying application to accurately provide components such as a digital guide and smart tips. Typically, Accessibility Application Program Interfaces (AAPIs) help the DAPs to understand the underlying framework used in application development to identify the user interface elements.

In Java applications and applets, Java Access Bridge (JAB) technology exposes Java Accessibility API (JAAPI) to provide support of accessibility in order to understand the underlying framework used in the development of the application and identify the user interface elements. The JAAPI is a part of Java Accessibilities Utilities. The JAAPI returns or fetches the elements in the visible screen, which are typically mapped to an index. While searching for a desired element or while querying a desired element in the Java application, a "GetVisibleChildren" method is typically employed. In this method, the JAAPI fetches all the user interface elements until it finds the desired element, which is laborious, time-intensive and inefficient.

Further, position of the desired element that is mapped to the index, may vary, due to changes in hierarchy within the Java application. The hierarchy of elements in the Java application typically varies due to scaling of the display set by the end user. In such instances, when the desired element is queried, the JAAPI again fetches all the user interface elements until it finds the desired element. In other words, the JAAPI needs to scan all the user interface elements to find the desired element which is again a time-consuming operation.

Additionally, there are multiple elements in the Java application that may have the same name or title while differing in operation. In such instances, the current method which merely fetches all the user interface elements until it finds the desired element, is incapable of detecting the desired element accurately based on the intended function.

Thus, there is a need in the art to address at least the aforementioned problems and limitations.

SUMMARY OF THE INVENTION

The present invention, in one aspect, provides a system for creating reference data for detecting a target element in a Java application. The system comprises one or more user devices in communication with a server. The user device comprises a processor configured to receive a selection of a target element via a user interface of the Java application. The processor is configured to traverse from the target element to a root element along a traversal path. The traversal path comprises of plurality of elements. The processor is configured to determine one or more neighboring elements of the target element. The processor is configured to determine attributes of each of the elements on the traversal path. The processor is configured to store the elements and the attributes of each of the elements on the traversal path and the one or more neighboring elements, thereby creating and storing the reference data on the server or the user device for enabling detection of the target element.

In an embodiment, the attributes comprise at least one of a name, a role, and a child count. The name corresponds to a name of the said element. The role corresponds to a control type of the said element. The child count corresponds to a number of child elements of the said element.

In an embodiment, the selection of the target element corresponds to monitoring input actions on the user interface of the Java application.

In an embodiment, the processor is configured to capture each of the elements on the traversal path using a Cascade Style Sheets (CSS) notation.

In an embodiment, the system is adapted to detect the target element based on the reference data. The processor in the system is configured to retrieve the reference data of the target element and transform the traversal path of the target element from the reference data into a nested object entity.

In an embodiment, the processor is configured to identify the root element from the nested object entity. The processor is configured to traverse from the root element in the traversal path towards the target element. The processor is configured to compare attributes of each of the elements in the traversal path with the elements of the reference data and determine any modification in the elements or the traversal path. The processor is configured to detect the target element upon matching the attributes of the target element from the reference data.

In an embodiment, the processor is configured to identify the root element from the nested object entity. The processor is configured to traverse from the root element in the traversal path towards the target element. The attributes of each of the elements are compared in the traversal path with the reference data and determine any modification in the elements or the traversal path. The processor is configured to determine whether a new element has modified the traversal path. A last matched element is then determined, the last matched element being the element preceding the new element. All child elements of the last matched element are then determined and traversed to capture attributes of the child elements. The processor is configured to compare the attributes of the child elements with the reference data. The target element is then detected upon matching the attributes of the child elements with the attributes of the target element.

In an embodiment, the processor is configured to identify the root element from the nested object entity. The processor is configured to traverse from the root element in the traversal path towards the target element. The processor is configured to compare attributes of each of the elements in the traversal path with the reference data and determine any modification in the elements or the traversal path. The processor is configured to determine a modified element in case of a mismatch in at least one attribute of the modified element in the traversal path. A last matched element is then determined, the last matched element being the element preceding the modified element. All child elements of the last matched element are then determined and traversed to capture attributes of the child elements. The processor is configured to compare the attributes of the child elements with the reference data. The target element is then detected upon matching the attributes of the child elements with the attributes of the target element.

In another aspect, the present invention provides a method for creating reference data for detecting a target element in a Java application. The method comprises receiving, by the processor of one of one or more user devices in communication with the server, selection of the target element via the user interface of the Java application. Thereafter, the method traverses from the target element to the root element along the traversal path, the traversal path comprising of the plurality of elements. One or more neighboring elements of the target element are then determined. Thereafter, attributes of each of the elements on the traversal path are determined. Further, the method comprises storing the elements and the attributes of each of the elements on the traversal path and the one or more neighboring elements, thereby creating and storing the reference data on the server or the user device for enabling detection of the target element.

In an embodiment, the selection of the target element comprises monitoring input actions on the user interface of the Java application.

In an embodiment, the method comprises capturing each of the elements on the traversal path using a cascading style sheets (CSS) notation.

In an embodiment, a method for detecting the target element based on the reference data created is disclosed. The method comprises retrieving the reference data of the target element and transforming, by the processor, the traversal path of the target element from the reference data into the nested object entity.

In an embodiment, the method comprises identifying the root element from the nested object entity. The method comprises traversing from the root element in the traversal path towards the target element. The method comprises comparing attributes of each of the elements in the traversal path with the elements of the reference data and determine any modification in the elements or the traversal path. The method comprises detecting the target element upon matching the attributes of the target element from the reference data.

In an embodiment, the method comprises identifying the root element from the nested object entity. The method comprises traversing from the root element in the traversal path towards the target element. The method comprises comparing attributes of each of the elements in the traversal path with the reference data and determine any modification in the elements or the traversal path. The method comprises determining in case of a modified traversal path whether the new element has modified the traversal path. The method comprises determining the last matched element. The last matched element is the element preceding the new element. The method comprises determining and traversing child elements of the last matched element to capture attributes of the child element. The method comprises comparing the attributes of the child elements with the reference data. The method comprises detecting the target element upon matching the attributes of one of the child elements with the attributes of the target element.

In an embodiment, the method comprises identifying the root element from the nested object entity. The method comprises traversing from the root element in the traversal path towards the target element. The method comprises comparing attributes of each of the elements in the traversal path with the reference data and determine any modification in the elements or the traversal path. The method comprises determining the modified element in case of mismatch in at least one attribute of the element in the traversal path. The method comprises determining the last matched element. The last matched element is the element preceding the modified element. The method comprises determining and traversing child elements of the last matched element to capture attributes of the child elements. The method comprises comparing the attributes the child elements with the reference data. The method comprises detecting the target element upon matching the attributes of one of the child elements with the attributes of the target element.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed towards a system and a method for detecting a target element in a Java application. The present invention enables faster and accurate detection of target elements in the Java application even when contents/layout of the underlying Java application are modified.

In an embodiment, the present invention is carried out on a digital adoption platform (DAP) installed on a system. The digital adoption platform is designed to support an end user with an underlying application. This may include new user onboarding, continuous training, self-serve contextual support, assistance with data field validation, and application change management. The platform technology may include omni-channel integrations (such as integrating with knowledge systems, bases, and repositories), workflow automation, in-place answers, workflow analytics, and content authoring.

Examples of the underlying applications include enterprise applications, custom applications, and end user applications. In some embodiments, the DAP may take the form of a dedicated application such as a Java application. Developers of an application may use the extension or the application to provide guided navigation to users of the underlying application so that the users can quickly learn how to use the application. The user's training and/or support experience can be enhanced with walkthroughs, smart pop-ups and tool-tips provided by the platform. These platform tools may be configured to show up based on a particular user's role and current location.

Figure 1:
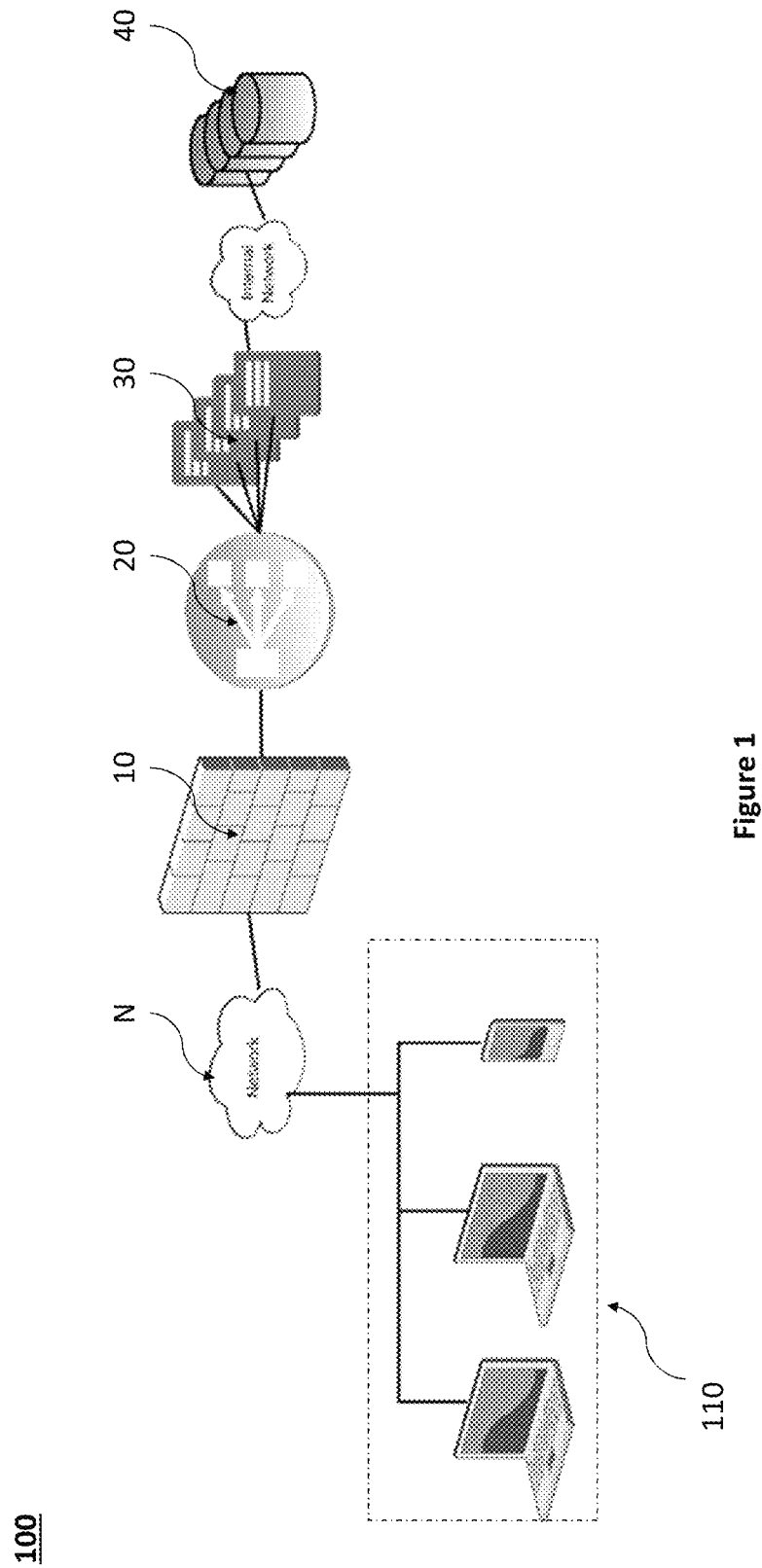
FIG. 1 shows a block diagram of a system for detecting a target element in a Java application, in accordance with an embodiment of the invention.

FIG. 1 shows a system 100 for detecting a target element in a Java application in accordance with an embodiment of the invention. The system 100 comprises one or more user devices 110, a server 40 and a network N. The user devices 110 can be selected from any electronic device such as a laptop, a desktop, or any other computing device that is capable of implementing instructions of the system 100. The user devices 110 comprise one or more processors (not shown), a memory (not shown), a storage unit (not shown), a communication module (not shown), a display device (not shown), input or output units (not shown), etc. The user devices 110 through the communication module communicates over the network N and connects with the server 40. The network N can be a wired network and/or a wireless network having variety of network devices such as routers, bridges, modems and the like, and the communication module of the user devices 110 is selected and configured based on the network requirements. The network N can be implemented as intranet, local area network (LAN), wide area network (WAN), the internet, and the like using different protocols, for example Hypertext Transfer Protocol (HTTP), Transmission Control Protocol/Internet Protocol (TCP/IP), Wireless Application Protocol (WAP), and the like.

As discussed hereinbefore, the step is created on a digital guidance platform installed on the system 100. In this regard, the digital guidance platform is installed on the storage unit of the user device 110. The digital guidance platform can be accessed through the user interface of the user device 110. The digital guidance platform may include a content creation/authoring module (also referred to as an editor) and a content playback/training module. The modules may reside on the user devices 110 or on the server 40. The modules may be downloaded to the user device 110. The user device 110 for content creation and content playback can be the same or different devices. The user device 110 for content creation, i.e., creating reference data for digital guidance is operated by a content creator, and the user device 110 can then be operated by an end user who accesses the underlying application over which the step/flow for digital guidance has been created.

Figure 2:
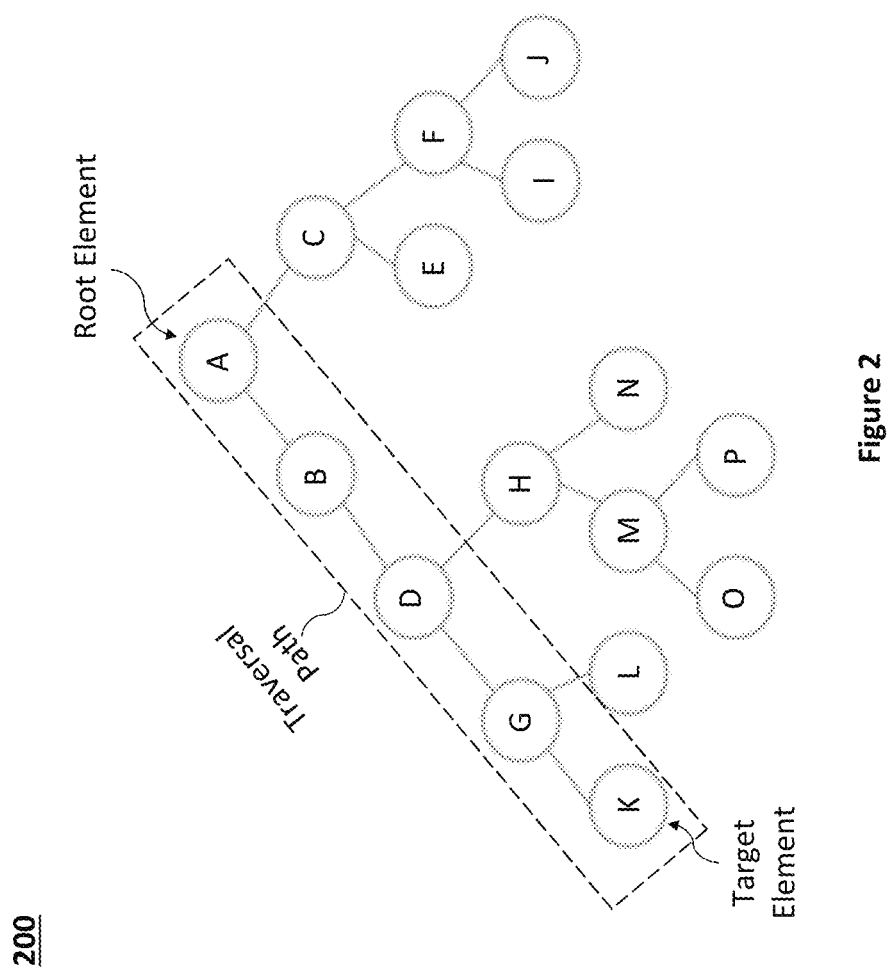
FIG. 2 shows an illustrative representation of a hierarchical structure of elements in the Java application, in accordance with an embodiment of the invention.

In an embodiment, the content authoring module allows a content author to create digital guidance for end users of an underlying Java application. The creation of steps begins by an author accessing/opening the underlying Java application for which the author wants to create the reference data, and then launching the digital guidance platform. The Java application has a user interface comprising elements. Elements in the Java Application demonstrate a hierarchical structure 200 (for e.g., as shown in FIG. 2). In the hierarchical structure, each element is a node and may have one or more neighboring elements. In an embodiment, the elements could range from a picture, a clickable hyperlinked text, button, dropdown, input, forms, videos, text-area, radio-button, charts, text, icons, date-picker, menu-items, search bar, header, paragraph, table, rows, columns, and the like.

Further, each element in the Java application comprises one or more attributes. Attributes refer to the property and/or characteristics possessed by each element. In an embodiment, the attributes comprise at least one of a name, a role, and a child count. The name corresponds to a title of the element. The role corresponds to a control-type of the element or a function of the element in the Java application. The child count corresponds to a number of child elements of the said element. By way of an example, for an element "file" that is configured to provide control options in the Java application, the title "file" is the name of the element and "menu" is the role or control-type, since the element "file" provides further options to a user of the Java application.

In an embodiment of the invention, the system 100 is configured to create the reference data for detecting the target element in the Java application with the help of Java Access Bridge Technology. Target element pertains to the element that is required to be detected in the Java application. The system 100 comprises a processor that is configured to receive a selection of the target element via the user interface of the Java application. In an embodiment, the selection of the target element comprises the step of monitoring a cursor position or cursor inputs or input actions on the user interface of the Java application in the user device 110. The element in the Java application that is selected is considered as the target element by the system 100.

The processor is then configured to traverse or navigate from the target element to a root element in the hierarchical structure along a traversal path. The root element corresponds to a root node or an origin node of the target element in the hierarchical structure. In an embodiment, the term 'traversal path' refers to path traversed or navigated by the processor from the target element to the root element in the hierarchy structure. During traversal, the processor identifies plurality of elements that are present along the traversal path from the target element to the root element. Upon identification of the elements between the target element and the root element, the processor is configured to determine attributes of the elements. While traversing along the traversal path, the processor also identifies one or more neighboring elements of the target element. Upon identification, the processor determines the attributes of the elements and stores the neighboring elements along with their attributes. In an embodiment, the processor is configured to capture each of the elements along with their attributes on the traversal path using a Cascading Style Sheets (CSS) notation. In an embodiment, the elements and attributes of each of the elements on the traversal path and the one or more neighboring elements is stored on the server 40 or the user device 110, thereby creating and storing the reference data on the server 40 or the user device 110 for enabling detection of the target element.

FIG. 2 shows an illustrative representation of a hierarchical structure 200 of elements in a Java application to illustrate the aspect of creating the reference data. In the figure element K is selected as the target element. Thereafter, tree traversal is initiated towards a root element. As shown element A is the root element of target element K. The traversal path is thus from the element K up to the root element A. During the traversal, the sibling element of the element K, element L, and elements G, D and B along the traversal path up to the root element A are stored. Accordingly, the processor captures and stores elements K, G, D, B and A along with their corresponding attributes on the server 40, thereby creating the reference data in the system 100.

As discussed hereinbefore, the content playback/training module provides digital guidance to end users of an underlying Java application. Accordingly, when the content playback/training module is executed on the user device 110, the reference data for which digital guidance has been created are retrieved. The processor upon retrieving the reference data is configured to transform the traversal path into a nested object entity. In the nested object entity, each child element is nested under a respective parent element. Thereafter, the processor initiates traversal towards the target element to be detected along the traversal path from the root element. In an embodiment, the processor traverses the traversal path using a depth first search tree traversal. The processor is configured to traverse from the root element along the traversal path towards the target element and compare attributes of each of the elements in the traversal path with the elements of the reference data and determine any modification in the elements or the traversal path. The processor is configured to detect the target element upon matching the attributes of the target element from the reference data. In an embodiment, the attributes such as the name of the element, the role of the element and the child count of the element are matched with the stored attributes of the element in the reference data. Thus, the system 100 detects the target element without traversing through the rest of the elements in the hierarchical structure 200, thereby saving time and being efficient. Referring to FIG. 2, for target element K, from the traversal path captured, the traversal starts from root element A, whereby the path traversed is A→B→D→G→K, whereby attributes are captured along the traversal path. Thus, the traversal is faster as much less number of elements are to be traversed, and the present invention obviates the requirement of traversing the entire tree. Moreover, due to comparison of attributes, the target element is accurately obtained, even when duplicate elements are present in the hierarchical structure 200. Also, by comparing attributes like name, role and child count of the target element as well as the one or more neighboring elements, accuracy of element detection is improved.

In an embodiment, the processor is adapted to compare attributes of each element that is captured in the reference data while traversing from the root element towards the target element. As such, when attribute of an element in the traversal path is mismatching correspondingly with the attributes in the reference data, the processor determines such element to be a new element or a modified element in the traversal path. The new element is an additional element which appears in the hierarchical structure whereas the modified element is an element with at least one changed attribute of said element.

Upon determination of the new element, the processor is configured to stop the traversal along the traversal path. At this juncture, the processor is configured to determine a last matched element, which is the element preceding the new element. The processor is configured to determine child elements of the last matched element, by traversing all the elements under the last matched element to capture attributes of the child elements, and compare the attributes of the child elements with the reference data. When the attributes of one of the child elements match with the attributes of the target element, the processor detects the target element. Thus, the system 100 detects the target element without traversing through the entire structure (or tree) but only the subset of the tree of the elements even in the modified hierarchical structure 200. The traversal of only a subset of the entire structure improves the performance of the system 100.

Figure 3:
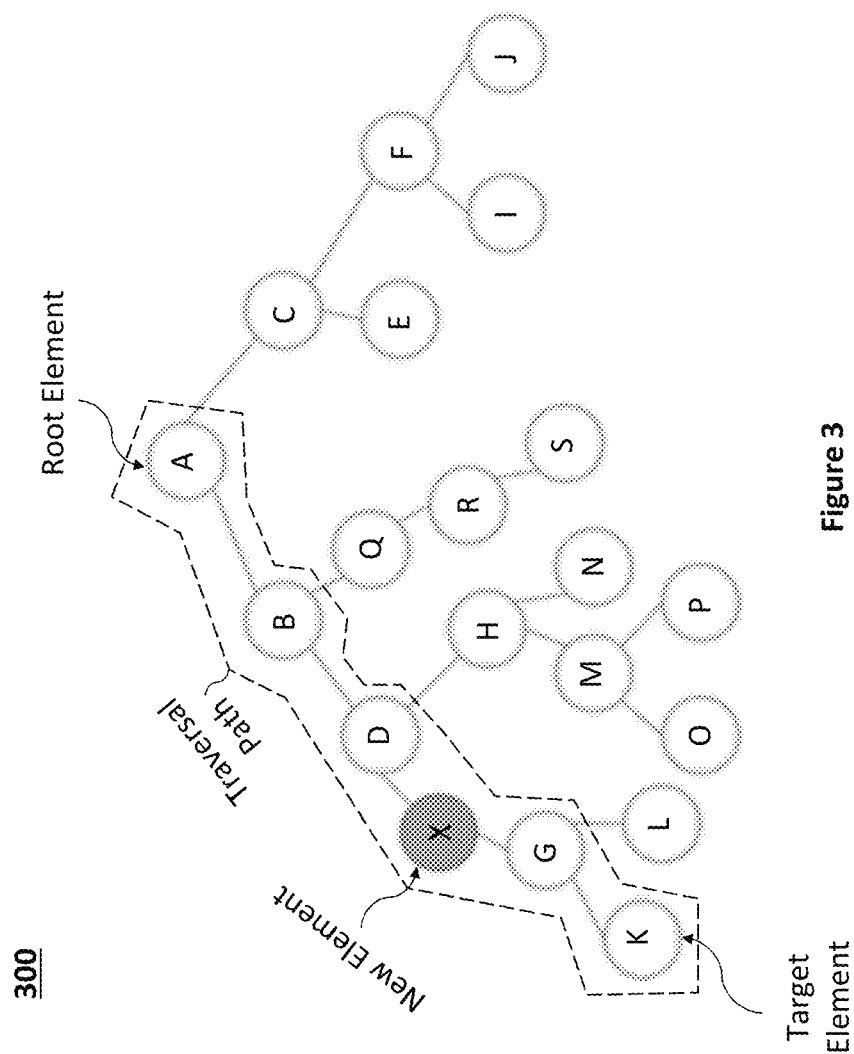
FIG. 3 shows an illustrative representation of a modified hierarchical structure of elements in the Java application in accordance with an embodiment of the invention.

FIG. 3 shows an illustrative representation of a modified hierarchical structure 300 of elements in the Java application to illustrate the aspect of element detection during playback. As can be seen, the hierarchical structure is a modified hierarchical structure 300 of elements in the Java application. The modified hierarchical structure 300 includes one or more new elements in the traversal path. The processor is configured to identify the root element A from the nested object entity, and traverse towards the target element K along the traversal path, while matching attributes of elements B, D and G with the attributes in the reference data. During comparison from the reference data, the processor determines that subsequent to the root element A, the element B is present and accordingly, the processor compares attributes of element B in the modified hierarchical structure 300 with the attributes in the reference data. Upon matching, the processor moves to element D and subsequently, to element X. However, as per the reference data subsequent to element D, element G is provided. As such, the processor compares the attributes of element X with attributes of element G in the reference data. Accordingly, the processor determines a mismatch and thus identifies element X to be the new element in the modified hierarchical structure 300. In an embodiment, a modification in the hierarchical structure 300 is also determined based on a change in the child count attribute of an element. Upon determining the new element X, the processor moves to element D, since the processor is certain about the path to the target element K until the element D. At this scenario, the processor determines all the child elements of the element D. In other words, the elements that are below the element D are determined, which are elements G and H. At this juncture, the processor only traverses to elements under element D-element H or element G, which includes elements X, G, K, L, H, M, N, O, and P, to capture attributes of the child elements, thereby performing sub-tree traversal. Thereafter, the attributes of the target element K, from the reference data, are compared against all the elements under element D-elements X, G, K, L, H, M, N, O, and P. Upon matching the attributes of the element K with the attributes of the target element, the processor determines the element K to be the target element. Accordingly, the system follows the sub-tree traversal and obviates the need to traverse the tree to the right of the elements under element B and element A, and the system does not go to other elements—elements Q, R and S under element B, and elements C, E, F, I and J under element A. This results in faster detection and improved efficiency during playback.

Further, upon determination of the modified element, the processor is configured to stop the traversal along the traversal path. At this juncture, the processor is configured to determine a last matched element, which is the element preceding the modified element. The processor is configured to determine child elements of the last matched element, by traversing all the elements under the last matched element to capture attributes of the child elements, and compare the attributes of each element with the reference data. The processor compares attributes of the child elements with the reference data. When the attributes of one of the child elements match with the attributes of the target element, the processor detects the target element. Thus, the system 100 detects the target element without traversing through the entire structure (or tree) but only the subset of the tree of the elements even in the modified hierarchical structure 300. The traversal of only a subset of the entire structure improves the performance of the system.

The present invention traverses the elements of the traversal path based on the hierarchical structure and the child elements of the last matched element of the traversal path in case of a modified hierarchical structure 300 to detect the target element. As a result, the detection is restricted to a limited number of elements as opposed to all the elements in the Java application and saves time.

Further, as shown in the figure, access to the server 40 is secured by a firewall 10 and a load balancer 20 that distributes the incoming request to an Application Programming Interface (API) server node 30 which stores the data (i.e., the steps/flow) on the server 40.

Figure 4:
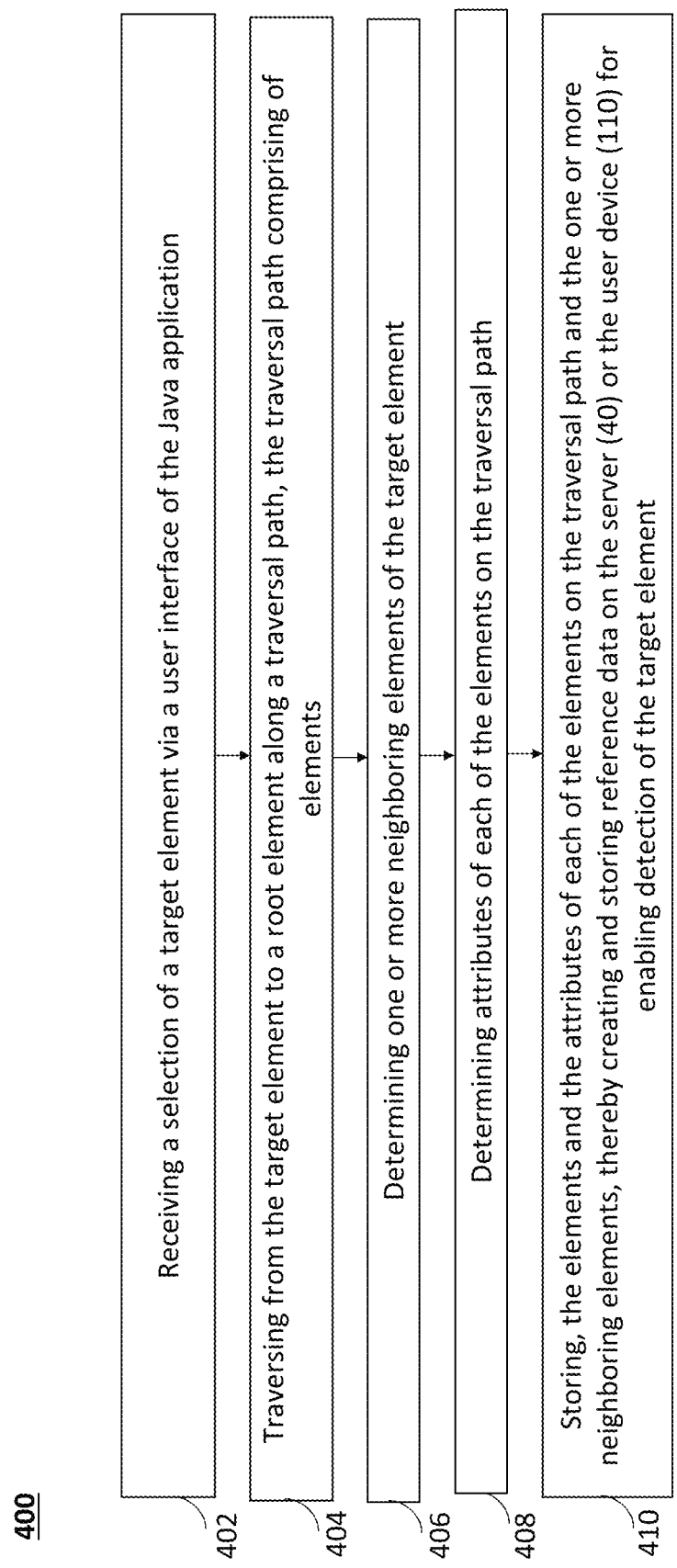
FIG. 4 shows a flow diagram of a method for creating the reference data for detecting the target element in the Java application, in accordance with an embodiment of the invention.

FIG. 4 shows a flow diagram of a method 400 for detecting the target element in the Java application in accordance with an embodiment of the invention. In order to perform the method 400, a system such as the system 100 shown in FIG. 1 may be used.

The method 400 for detecting the target element begins at creation of the reference data. At step 402, the processor receives the selection of the target element via the user interface of the Java application. In an embodiment, the selection of the target element corresponds to monitoring the cursor position on the user interface of the Java application in the user device 110. Thereafter, at step 404, the processor traverses from the target element to the root element along the traversal path. The traversal path comprises of the plurality of elements of the Java application.

At step 406, one or more neighboring elements of the target element are determined. The one or more neighboring elements of the target element include one or more sibling elements and one or more parent elements. At step 408, attributes of each of the elements on the traversal path are determined.

At step 410, the elements and the attributes of each of the elements on the traversal path and the one or more neighboring elements are stored on the server 40 or the user device 110, thereby creating and storing the reference data on the server 40 or the user device 110 for enabling detection of the target element. The processor is configured to capture each of the elements on the traversal path using the CSS notation.

Figure 5A:
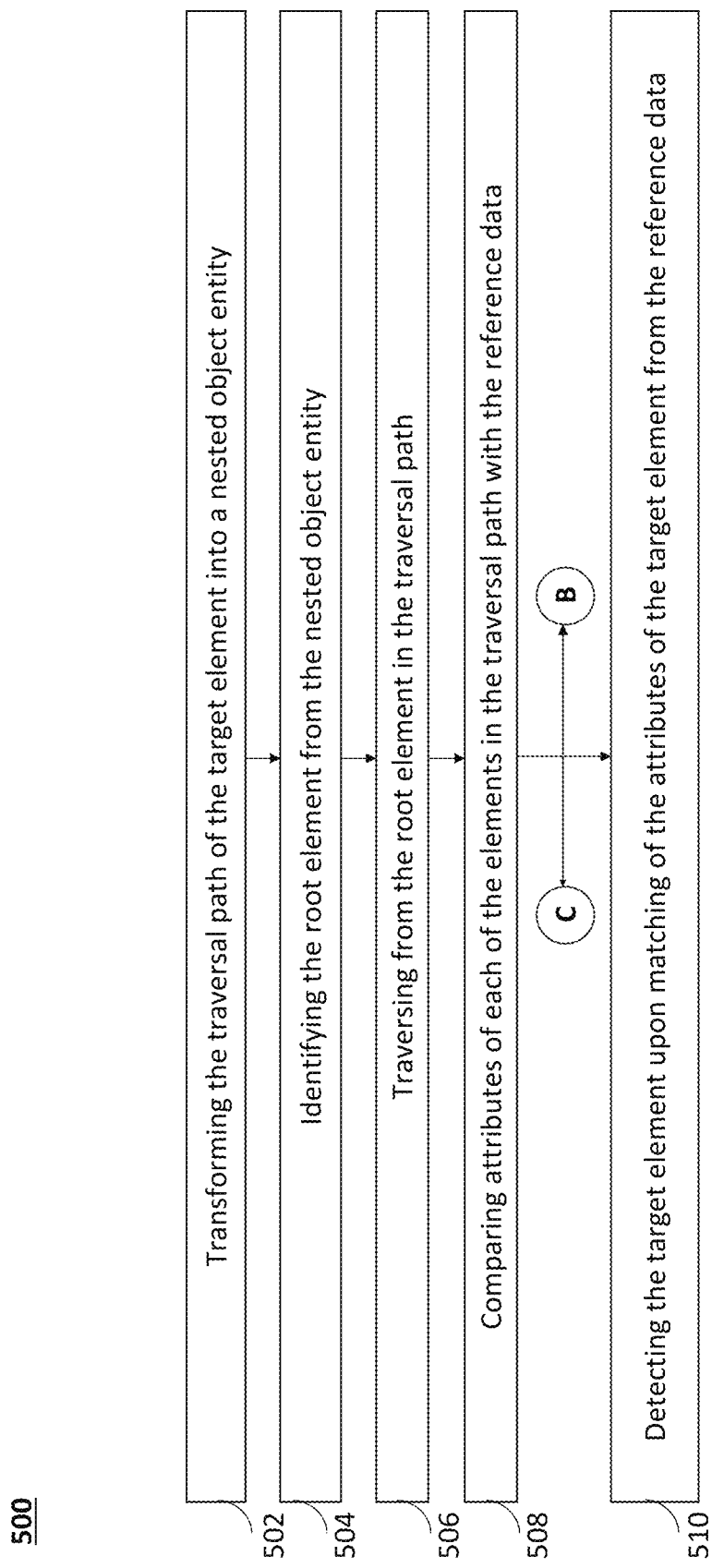
FIG. 5A shows a flow diagram of a method for detecting the target element based on the reference data using traversal path, in accordance with an embodiment of the present invention.
Figure 5B:
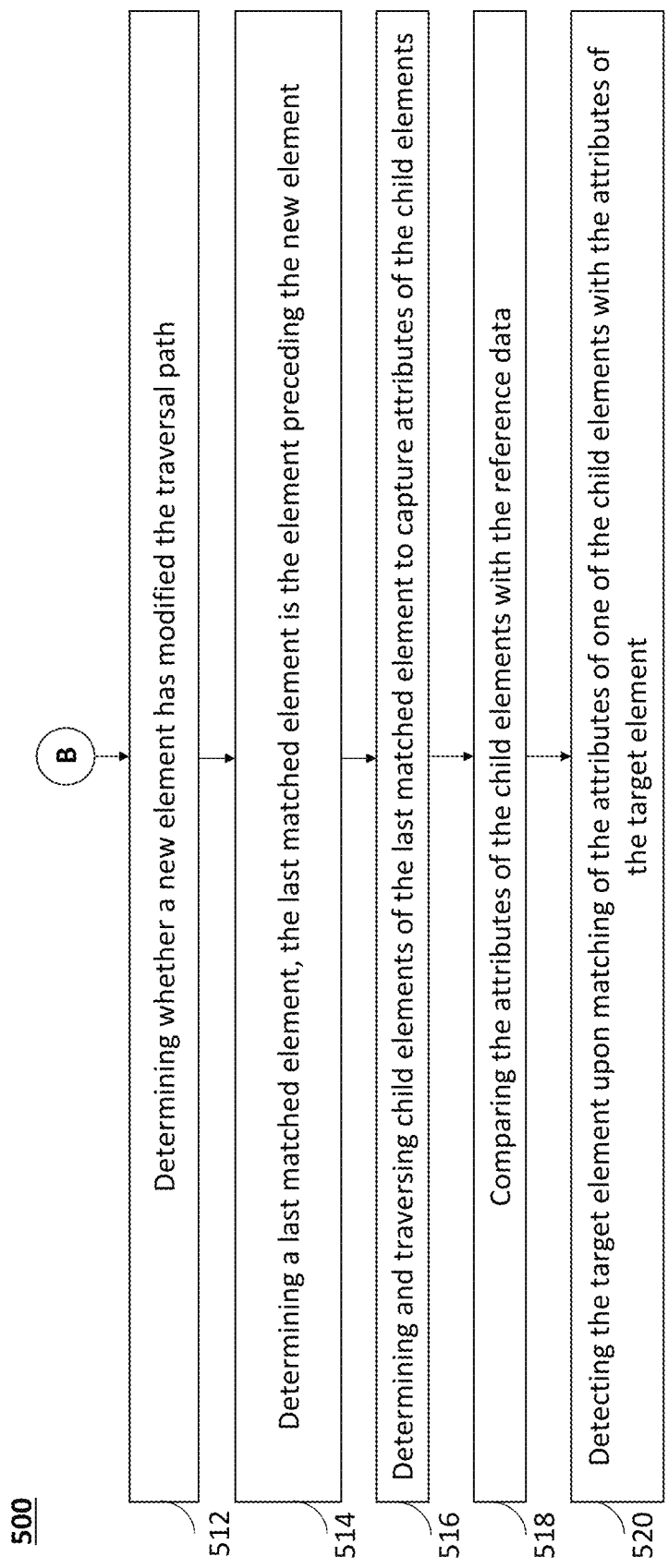
FIG. 5B shows a flow diagram of a method for detecting the target element based on the reference data using fallback sub-tree traversal, in accordance with an embodiment of the present invention.
Figure 5C:
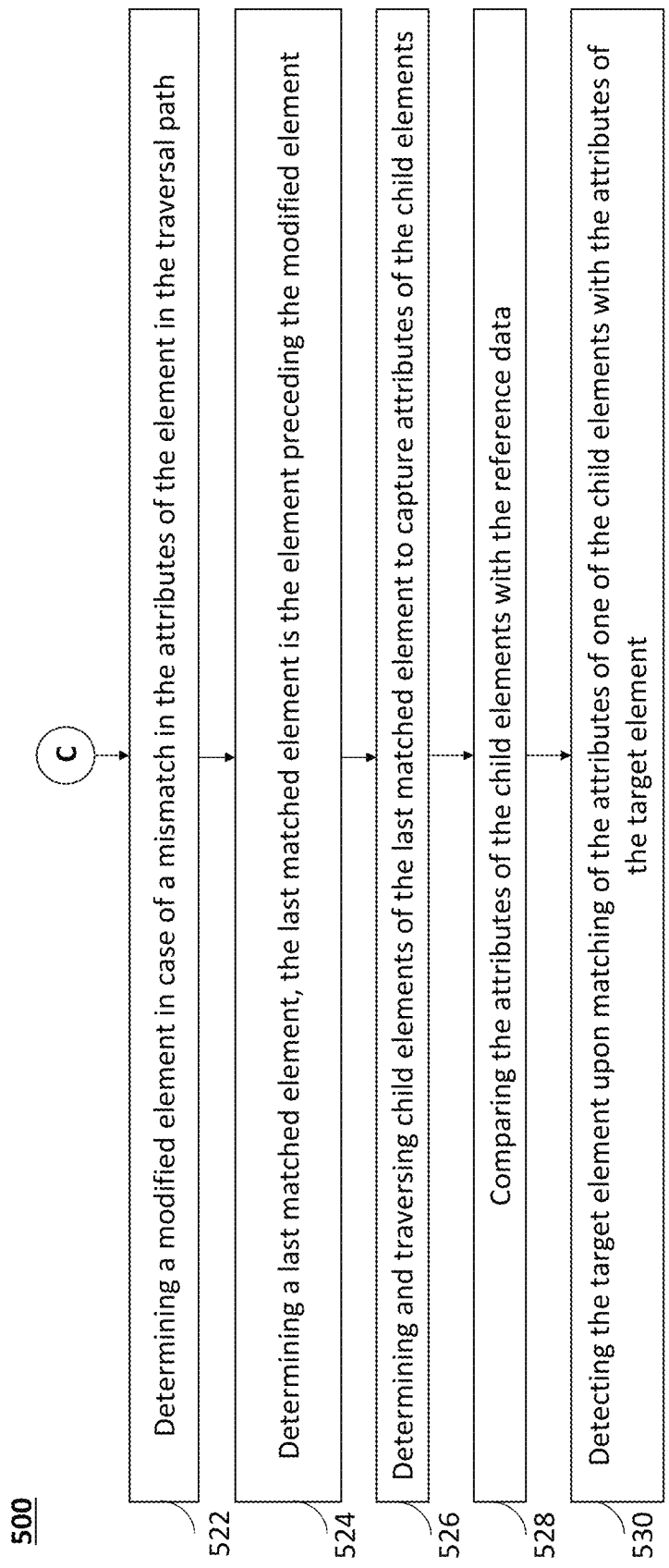
FIG. 5C shows a flow diagram of the method for detecting the target element based on the reference data using fallback sub-tree traversal, in accordance with another embodiment of the present invention.

FIGS. 5A through 5C show a flow diagram of a method 500 for detecting the target element in the Java application based on the reference data using the traversal path, in accordance with an embodiment of the present invention. FIG. 5B shows a flow diagram of the method 500 for detecting the target element based on the reference data using fallback sub-tree traversal, in accordance with an embodiment of the present invention.

Referring to FIG. 5A, the processor retrieves the reference data of the target element and at step 502, the processor transforms the traversal path of the target element into the nested object entity. In the nested object entity, each child element is nested under a respective parent element.

At step 504, the processor identifies the root element from the nested object entity. At step 506, the processor traverses from the root element in the traversal path towards the target element. In an embodiment, the processor traverses using the depth first search tree traversal. At step 508, the processor compares the attributes of each of the elements in the traversal path with the reference data. In other words, the processor compares each element that is traversed with the elements of the reference data and determines any modification in the elements of the traversal path. At step 510, the processor detects the target element upon matching the attributes of the target element from the reference data. Thus, the target element is detected without traversing through the rest of the elements in the hierarchical structure, thereby saving time and increasing accuracy of detection.

Referring to FIG. 5B in conjunction with FIG. 5A, at step 508, the processor determines if there is any modification in the elements of the traversal path and moves to step 512. At step 512, the processor determines whether a new element has modified the traversal path. In other words, at step 512 the processor determines whether the hierarchical structure 200 is modified to the modified hierarchical structure 300 due to the new element.

At step 514, the processor determines the last matched element and proceeds to step 516 for determining and traversing the child elements of the last matched element to capture attributes of the child elements. At step 518, the processor is configured to compare attributes of all the elements that are below the last matched element with the attributes of the target element.

At step 520, the processor detects the target element upon matching the attributes of one of the child element with the attributes of the target element. Thus, the target element is detected without traversing through the rest of the elements in the modified hierarchical structure thereby saving time and increasing accuracy of detection.

FIG. 5C shows a flow diagram of the method 500 for detecting the target element based on the reference data using fallback sub-tree traversal, in accordance with another embodiment of the present invention. Referring to FIG. 5C in conjunction with FIG. 5A, at step 508, the processor determines if there is any modification in the elements of the traversal path and moves to step 522. At step 522, the processor determines the modified element in case of a mismatch in at least one attribute of the element in the traversal path. In other words, at step 522 the processor determines whether an element in the traversal path has been replaced by another element from the modified hierarchical structure or at least one of the attributes of at least one element has changed due to the modified element.

At step 524, the processor determines the last matched element and proceeds to step 526 for determining and traversing the child elements of the last matched element to capture attributes of the child elements. At step 528, the processor is configured to compare attributes of all the elements that are below the last matched element with the attributes of the target element.

At step 530, the processor detects the target element upon matching the attributes of one of the child element with the attributes of the target element. Thus, the target element is detected without traversing through the rest of the elements in the modified hierarchical structure thereby saving time and increasing accuracy of detection.

The system and the method of the present invention is capable of detecting the target element in 10-20 ms in best cases of traverse path and 700-900 ms in worst case of sub-tree traversal respectively which are more robust, more accurate, and much faster. Additionally, the system is adapted to reduce time taken for detecting the target element by 90% than that of the conventional methods employed for detecting the target element.

As discussed hereinbefore, the processor is configured to compare the attributes of the elements in the traversal path. In an embodiment, even if the content or layout of the Java application changes causing a change in the target element, the present invention determines the target element through the reference data. The system uses scale factor to scale up or scale down coordinates of the target element to match the alignment.

Advantageously, the present invention through the creation of reference data enables detection of the target element even when contents or layout of the Java application are modified, thereby saving time, while being efficient.

While the present invention has been described with respect to certain embodiments, it will be apparent to those skilled in the art that various changes and modification may be made without departing from the scope of the invention as defined in the following claims.

We claim:

1. A system (100) for creating reference data for detecting a target element in a Java application, the system (100) comprising:
   one or more user devices (110) in communication with a server (40), the user device (110) comprising a processor configured to:
   receive selection of a target element via a user interface of the Java application;
   traverse from the target element to a root element along a traversal path, the traversal path comprising of plurality of elements;
   determine one or more neighboring elements of the target element;
   determine attributes of each of the elements on the traversal path; and
   store the elements and attributes of each of the elements on the traversal path and the one or more neighboring elements, thereby creating and storing the reference data on the server (40) or the user device (110) for enabling detection of the target element.

2. The system (100) as claimed in claim 1, wherein the attributes comprise at least one of a name, a role, and a child count, wherein the name corresponds to a name of the said element, the role corresponds to a control type of the said element and the child count corresponds to a number of child elements of the said element.

3. The system (100) as claimed in claim 1, wherein the selection of the target element corresponds to monitoring input actions on the user interface of the Java application.

4. The system (100) as claimed in claim 1, wherein the processor is configured to capture each of the elements on the traversal path using a cascading style sheets (CSS) notation.

5. A system (100) for detecting the target element based on the reference data created as claimed in claim 1, wherein the processor is configured to retrieve the reference data of the target element and transform the traversal path of the target element from the reference data into a nested object entity.

6. The system (100) as claimed in claim 5, wherein the processor is configured to:
   identify the root element from the nested object entity;
   traverse from the root element in the traversal path towards the target element;
   compare attributes of each of the elements in the traversal path with the elements of the reference data and determine any modification in the elements or the traversal path; and
   detect the target element upon matching the attributes of the target element from the reference data.

7. The system (100) as claimed in claim 5, wherein the processor is configured to:
   identify the root element from the nested object entity;
   traverse from the root element in the traversal path towards the target element;
   compare attributes of each of the elements in the traversal path with the reference data and determine any modification in the elements or the traversal path;
   determine in case of a modified traversal path whether a new element has modified the traversal path;
   determine a last matched element, the last matched element being the element preceding the new element;
   determine and traverse child elements of the last matched element to capture attributes of the child elements;
   compare the attributes of the child elements with the reference data; and
   detect the target element upon matching the attributes of one of the child elements with the attributes of the target element.

8. The system (100) as claimed in claim 5, wherein the processor is configured to:
   identify the root element from the nested object entity;
   traverse from the root element in the traversal path towards the target element;
   compare attributes of each of the elements in the traversal path with the reference data and determine any modification in the elements or the traversal path;
   determine a modified element in case of a mismatch in at least one attribute of the element in the traversal path;
   determine a last matched element, the last matched element being the element preceding the modified element;
   determine and traverse child elements of the last matched element to capture attributes of the child elements;
   compare the attributes of the child elements with the reference data; and
   detect the target element upon matching the attributes of one of the child elements with the attributes of the target element.

9. A method (400) for creating reference data for detecting a target element in a Java application, the method (400) comprising:
   receiving (402), by a processor of one of one or more user devices (110) in communication with a server (40), a selection of a target element via a user interface of the Java application;
   traversing (404), from the target element to a root element along a traversal path, the traversal path comprising of plurality of elements;
   determining (406), one or more neighboring elements of the target element;
   determining (408), attributes of each of the elements on the traversal path; and
   storing (410) on the server (40) or the user device (110), the elements and the attributes of each of the elements on the traversal path and the one or more neighboring elements, thereby creating and storing the reference data for enabling detection of the target element.

10. The method (400) as claimed in claim 9, wherein the selection of the target element comprises monitoring input actions on the user interface of the Java application.

11. The method (400) as claimed in claim 9 comprising capturing, by the processor, each of the elements on the traversal path using a cascading style sheets (CSS) notation.

12. A method (500) for detecting the target element based on the reference data created as claimed in claim 9 comprising retrieving the reference data of the target element and transforming (502), by the processor, the traversal path of the target element from the reference data into a nested object entity.

13. The method (500) as claimed in claim 12 comprising:
   identifying (504) the root element from the nested object entity;
   traversing (506) from the root element in the traversal path towards the target element;
   comparing (508) attributes of each of the elements in the traversal path with the elements of the reference data and determine any modification in the elements or the traversal path; and detecting (510) the target element upon matching the attributes of the target element from the reference data.

14. The method (500) as claimed in claim 12 comprising:
identifying (504), the root element from the nested object entity;
traversing (506) from the root element in the traversal path towards the target element;
comparing (508) attributes of each of the elements in the traversal path with the reference data and determine any modification in the elements or the traversal path;
determining (512) in case of a modified traversal path whether a new element has modified the traversal path;
determining (514) a last matched element, the last matched element being the element preceding the new element;
determining and traversing (516) child elements of the last matched element to capture attributes of the child element;
comparing (518) the attributes of the child elements with the reference data; and
detecting (520) the target element upon matching the attributes of one of the child elements with the attributes of the target element.

15. The method (500) as claimed in claim 12 comprising:
identifying (504), the root element from the nested object entity;
traversing (506) from the root element in the traversal path towards the target element;
comparing (508) attributes of each of the elements in the traversal path with the reference data and determine any modification in the elements or the traversal path;
determining (522) a modified element in case of a mismatch in at least one attribute of the element in the traversal path;
determining (524) a last matched element, the last matched element being the element preceding the modified element;
determining and traversing (526) child elements of the last matched element to capture attributes of the child elements;
comparing (528) the attributes the child elements with the reference data; and
detecting (530) the target element upon matching the attributes of one of the child elements with the attributes of the target element.

\* \* \* \* \*